(12) United States Patent
Hsia et al.

(10) Patent No.: US 7,016,565 B2
(45) Date of Patent: Mar. 21, 2006

(54) MICRO-OPTIC FIBER DEVICE

(75) Inventors: Chung-Ho Hsia, San Jose, CA (US);
Pai-Sheng Shen, Bellevue, WA (US)

(73) Assignee: Lightel Technologies Inc., Kent, WA (US)

( * ) Notice: Subject to any disclaimer, the term of this patent is extended or adjusted under 35 U.S.C. 154(b) by 112 days.

(21) Appl. No.: 10/458,813

(22) Filed: Jun. 10, 2003

(65) Prior Publication Data

US 2004/0252941 A1    Dec. 16, 2004

(51) Int. Cl.
*G02B 6/32* (2006.01)

(52) U.S. Cl. ............................. 385/34; 385/33; 385/74
(58) Field of Classification Search ................. 385/34, 385/53, 55, 58, 60, 65, 31, 33, 74
See application file for complete search history.

(56) References Cited

U.S. PATENT DOCUMENTS 6,282,339 B1 * 8/2001 Zheng .......................... 385/34
6,701,040 B1 * 3/2004 Li et al. ....................... 385/34
6,804,435 B1 * 10/2004 Robilliard et al. ............ 385/33
2003/0138204 A1 * 7/2003 Zhou et al. ................... 385/33

* cited by examiner

*Primary Examiner*—Juliana Kang
(74) *Attorney, Agent, or Firm*—Pai Patent & Trademark Law Firm; Chao-Chang David Pai

(57) ABSTRACT

A micro-optic fiber device is provided with independent counter-bore tubes and coupling tubes serving as couplers for coupling the optical processing elements, micro lenses and the fiber pigtails. The micro-optic fiber device can be built using direct coupling manner, wherein the optical processing element is firstly inserted and fixed in the step groove of the counter-bore tube by applying bonding agent between the outer periphery of the optical processing element and the inner surface of the step groove, and then the counter-bore tube is coupled with the coupling tubes, thus eliminating the need of using bonding agent between the optical processing element and the micro lenses and preventing the bonding agent from diffusing and spreading over the optical path.

9 Claims, 3 Drawing Sheets

MICRO-OPTIC FIBER DEVICE

BACKGROUND OF THE INVENTION

1. Field of the Invention

The invention relates to a micro-optic fiber device, and more particularly to the technology for coupling, disposing and slightly turning the respective component such as the optical processing element, the fiber collimators, and the coupling tubes, which constitute the micro-optic fiber device.

2. Description of the Prior Arts

The most popular approach to making a micro-optic fiber device is to make two fiber collimators separately and insert an optical processing element such as WDM filters, isolator cores, birefringent crystals of PM combiners, and circulator cores in between to form fiber optic WDM devices, fiber-in-line-isolators, fiber PM combiners, and fiber circulators respectively. In the conventional art the collimators are attached to the optical processing elements either using soldering (tin solder) or bonding (epoxy). Usually the outer housing of the above-mentioned collimators is made of metals, and the optical processing elements are attached to the first or the second collimator using epoxy bonding or soldering (to form so-called subassembly). The subassemblies based on fiber collimators are then aligned and fixed using soldering or epoxy bonding techniques.

Although widely used in the fiber component manufacturing, the above-mentioned processes are operator dependent. The acceptance rate of the final products is accordingly low and skilled workers are not easy to find.

The most important point is that because the optical processing elements are attached to the collimators directly using epoxy or soldering bonding, the epoxy will flow into the optical path of the optical processing element and then will influence the optical path to such an extent as to deteriorate the optical performance. Stresses need to be applied on the elements for aligning purposes in the case of soldering, therefore the devices built suffer from high thermal dependent loss and insertion loss. This step, to some extent, has become the bottleneck in manufacturing the micro-optic fiber device.

Besides the above-mentioned techniques, another approach, according to U.S. Pat. No. 6,185,347 for making wavelength division multiplexed (WDM) devices, uses a dual fiber collimator and a single fiber collimator. In the dual fiber collimator a WDM filter is first attached to the first GRIN lens using a thermal cued epoxy. The subassembly is then inserted into a glass tube and fixed using the thermal cured epoxy. A dual fiber pigtail is then aligned to the subassembly with lowest reflection insertion loss and connected to the glass tube subassembly using a second glass tube, which forms the dual fiber collimator.

In the single fiber collimator, the second GRIN lens and a single fiber pigtail are inserted in the third glass tube aligned to dual fiber collimator for the lowest transmission insertion loss and fixed with thermal cured epoxy. Finally, the dual fiber collimator and the single fiber collimator are aligned with the lowest transmission insertion loss and joined at the first and the third glass tube using thermal cured epoxy. Although simple, the approach does not provide devices with optimal reflection and transmission insertion loss.

For filter attachment in a WDM device, the industry is now widely adopting the direct attachment of the filter onto the GRIN lens. The process needs the operator to align the filter with GRIN lens under a microscope and then apply UV epoxy on the surrounding of the GRIN lens-filter interface to prevent the thermal-cured epoxy applied later from flow into the optical path and at the same time to glue them together. In the patent (U.S. Pat. No. 6,185,347), the epoxy is used in between GRIN lens and the filter and thus it is an epoxy-in-the-optical-path design that system manufacturers disfavor.

The present invention has arisen to mitigate or obviate the afore-described disadvantages of the conventional micro-optic fiber device.

SUMMARY OF THE INVENTION

The primary object of the present invention is to provide a micro-optic fiber device, wherein the optical processing elements, micro lenses and the fiber pigtails can be coupled by virtue of independent counter-bore tubes and coupling tubes, such that the micro-optic fiber device can be built by coupling the counter-bore tubes and the coupling tubes, thus eliminating the need of using bonding agent between the optical processing element and then micro lenses and preventing the bonding agent from diffusing and spreading over the optical path of the optical processing element as well as the micro lenses.

The secondary object of the present invention is to provide a micro-optic fiber device, the components of which, such as optical processing elements, micro lenses and fiber pigtails, etc. can be directly inserted into the through passage and step groove of the counter-bore tube or the passage of the coupling tubes and fixed using epoxy bonding or soldering, and the counter bore tube then can be connected with the respective coupling tubes, such that the micro-optic fiber device of the present invention is much less operator dependent and its acceptance rate is much improved relatively.

Another object of the present invention is to provide a micro-optic fiber device, which allows larger optical processing elements to be accommodated and coupled by virtue of the through hole design in the independent inserting tube, thereby making the micro-optic fiber device of the present invention applicable to different types of optical processing elements.

A further object of the present invention is to provide a micro-optic fiber device, who the diameter of the passage of the coupling tube is greater than that of the micro lenses, and through the longitudinal and the axial movements of the coupling tubes the optical processing element and the fiber collimators are aligned whereby to fine-tune the insertion loss as well as the polarization dependent loss. In other words, the slightly adjustable design greatly improves the acceptance rate and accuracy of the products.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
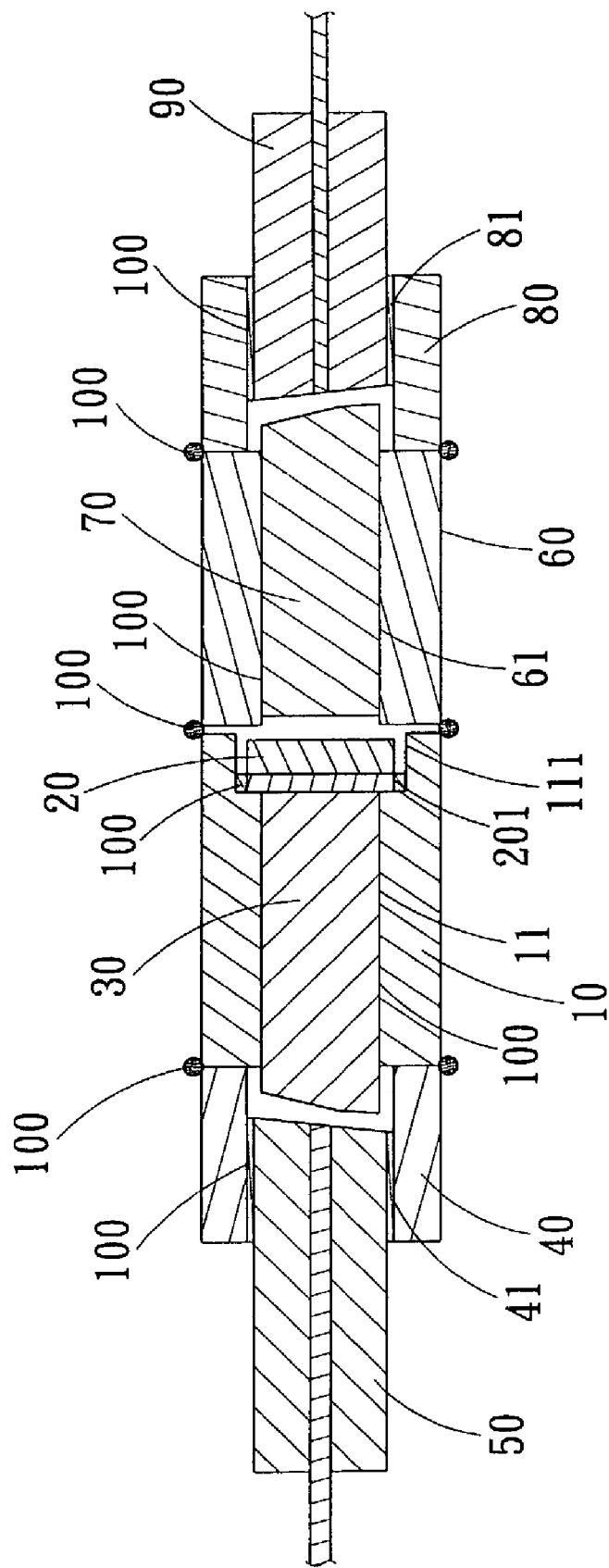
FIG. 1 is a cross-sectional view of a micro-optic fiber device in accordance with the first embodiment of the present invention.

Referring to FIG. 1, wherein a micro-optic fiber device is shown and generally comprising: an optical processing element 20 here taking wavelength division multiplexed (WDM) device as an example), a counter-bore tube 10, three coupling tubes 40, 60, 80, a pair of micro lenses 30, 70 (such as GRIN lenses), a dual fiber pigtail 50 and a single fiber pigtail 90.

The counter-bore tube 10 interiorly defines a through passage 11. At an end of the passage 11, a step groove 111, which has a greater diameter than the passage 11, is defined for insertion of the optical processing element 20. The epoxy or solder 100 is applied to the outer periphery 201 of the optical processing element 20 and the inner surface of the step groove 111 for strengthening the bonding between the counter-bore tube 10 and the optical processing element 20. The first micro lens 30 is likewise fixed in the passage 11 of the counter-bore tube 10 using epoxy or solder 100 to form a subassembly (including the counter-bore tube 10, the optical processing element 20, and the first micro lens 30).

The first coupling tube 40 interiorly defines a through passage 41 for insertion of the dual fiber pigtail 50. Between the dual fiber pigtail 50 and the coupling surfaces of the first coupling tube 40 epoxy or solder 100 is applied to strengthen the bonding. The dual fiber pigtail 50 is then aligned to the subassembly with lowest reflection insertion loss, and at the joint between the first coupling tube 40 and the counter-core tube 10 epoxy or solder 100 is applied for bonding them together.

Finally, for the output part, the second coupling tube 60 interiorly defines a passage 61 for insertion of the second micro lens 70 which is fixed with the second coupling tube 60 by using epoxy bonding or sold 100. The second micro lens 70 is then aligned to the optical processing element 20 and the epoxy or solder 100 is applied to the joint between the second coupling tube 60 and the counter-bore tube 10 for bonding them together.

The third coupling tube 80 interiorly defines a through passage 81 for insertion of the single fiber pigtail 90. The single fiber pigtail 90 is then aligned to the dual fiber pigtail 50 with lowest transmission insertion loss. The third coupling tube 80 is then attached to the second coupling tube 60 using epoxy bonding or soldering 100 to form a micro-optic fiber device of the present invention. In the present invention, the counter-bore tube 10 as well as the first, second, third coupling tube 40,60,80 can be metal or glass made.

It is learned from the above description that the optical processing element 20 is disposed in the step groove 111 of the counter-bore tube 10 with the outer periphery 201 bonding with the counter-bore tube 10. The optical processing element 20 is not directly bonded with the first micro lens 30 or the second micro lens 70 at all, such that the disadvantage of the epoxy flowing and diffusing into the optical path of the optical processing element 20 can be obviated effectively.

It will be noted that the optical processing element 20, the first micro lens 30, the second micro lens 70, the dual fiber pigtail 50 and the single fiber pigtail 90 are allowed to firstly be inserted, respectively, in the step groove 111 of the counter-bore tube 10, the counter-bore tube 10, the second coupling tube 60, the first coupling tube 40 and the third coupling tube 80. And then the counter-bore tube 10 is connected with the first coupling tube 40 and the second coupling tube 60 using epoxy bonding or soldering. Thus the optical processing element 20, the first micro lens 30, the second micro lens 70, the dual fiber pigtail 50 and the single fiber pigtail 90 are connected and bonded in a fixed manner. Thereby, the assembling processes in accordance with the present invention are less skill dependent and the acceptance rate is rather high (as compared to the conventional art which is technique dependent and accordingly low in the acceptance rate).

It will be further noted that in the micro-optic fiber device, wherein the diameters of the first and the third coupling tube 40,80 are greater than those of the first and second micro lenses 30,70, through the longitudinal and the axial movements of the first or the third coupling tube 40, 80, the optical processing element 20 can be aligned whereby to fine-tune the insertion loss as well as the polarization dependent loss.

Figure 2:
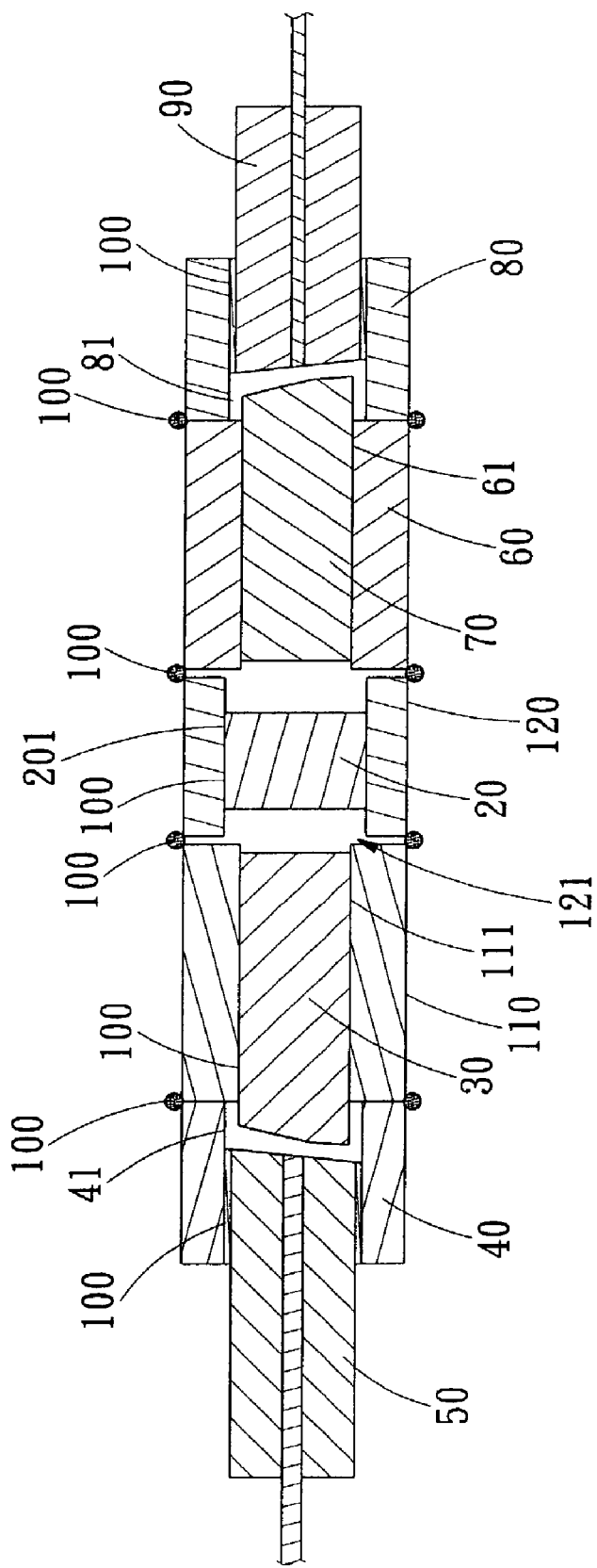
FIG. 2 is a cross-sectional view of a micro-optic fiber device in accordance with the second embodiment of the present invention.

In addition, in cases where the volume of the optical processing element 20 (such as the WDM filter, isolator cores, birefringent reflection crystals of PM combiner, circulator cores) is rather large, the previously mentioned counter-bore tube 10 can be replaced by two independent inserting tubes with different inner diameters, namely, a first inserting tube 110 and a second inserting tube 120 as shown in FIG. 2. Therein the first inserting tube 110 is interiorly provided with a passage 111 for insertion of the first GRIN lens 30 while the second inserting tube 120 is interiorly provided with a through hole 121 for accommodating larger optical processing element 20 and the epoxy 100 is applied to the outer periphery 201 of the optical processing element 20 for bonding with the inner surface of the through hole 121. The first, second, and third coupling tubes 40,60,80 are interiorly provided with passages 41,61,81 respectively for insertion of the dual fiber pigtail 50, the second micro lens 70, and the single fiber pigtail 90, respectively. By such arrangements, the first and the second inserting tube 110, 120 as well as the first, the second, the third coupling tube 40,60,80 can be attached to each other using epoxy 100 or soldering bonding.

Figure 3:
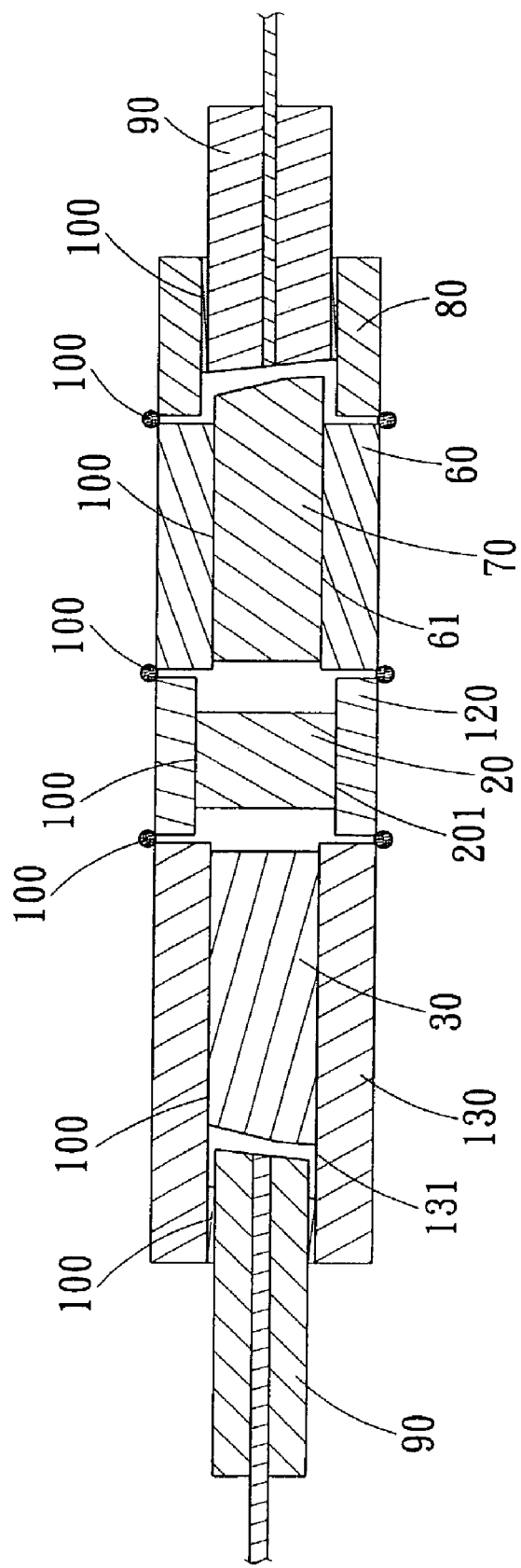
FIG. 3 is a cross-sectional view of a micro-optic fiber device in accordance with the third embodiment of the present invention.

In single-input and single-output applications, such as isolators, only an input collimator is needed. The output/input is a single fiber pigtail 90 (see FIG. 3). In this case, a single coupling tube 130 can replace the first coupling tube 40 and the first inserting tube 110 in FIG. 2. The single coupling tube 130 interiorly defines a through passage 131 for accommodating the single fiber pigtail 90 and the first GRIN lens 30.

While we have shown and described various embodiments in accordance with the present invention, it should be clear to those skilled in the art that further embodiments may be made without departing from the scope of the present invention.

What is claimed is:

1. A micro-optic fiber device comprising:
   a counter-bore tube, which interiorly defines a through passage, wherein a first micro lens is fixed, and a step groove at an end of the trough passage with diameter larger than that of the through passage, said step groove having fixed therein an optical processing element with a diameter larger than that of the through passage;
   a first coupling tube, which interiorly defines a through passage wherein a first fiber pigtail is fixed;
   a second coupling tube, which interiorly defines a through passage wherein a second micro lens is fixed; and
   a third coupling tube, which interiorly defines a through passage wherein a second fiber pigtail is fixed;
   wherein the optical processing element is fixed in the step groove of the counter-bore tube by placing the optical processing element against the end of the through passage of the counter-bore tube and applying a bonding agent between the outer lateral periphery of the optical processing element and the inner surface of the step groove surrounding the outer lateral periphery of the optical processing element, and said micro-optic fiber device is built by coupling the counter-bore tube with the first coupling tube and with the second coupling tube, and then coupling the second coupling tube with the third coupling tube.

2. The micro-optic fiber device as claimed in claim 1, wherein each of the counter-bore tube, the first coupling tube, the second coupling tube and the third coupling tube is made of metal.

3. The micro-optic fiber device as claimed in claim 2, wherein the counter-bore tube is coupled with the first coupling tube and the second coupling tube using soldering.

4. The micro-optic fiber device as claimed in claim 1, wherein each of the counter-bore tube, the first coupling tube, the second coupling tube and the third coupling tube is made of glass.

5. The micro-optic fiber device as claimed in claim 1, wherein
   the counter-bore tube is coupled with the first coupling tube and the second coupling tube using epoxy bonding;
   the bonding agent applied between the outer lateral periphery of the optical processing element and the inner surface of the step groove is epoxy resin; and
   the first micro lens is fixed in the through passage of the counter-bore tube, the first fiber pigtail is fixed in the through passage of the first coupling tube, the second micro lens is fixed in the through passage of the second coupling tube, and the second fiber pigtail is fixed in the through passage of the third coupling tube, using epoxy bonding.

6. The micro-optic fiber device as claimed in claim 1, wherein the optical processing element is a wavelength division multiplexed (WDM) filter.

7. The micro-optic fiber device as claimed in claim 1, wherein at least one of the counter-bore tube, the first coupling tube, the second coupling tube and the third coupling tube is made of metal, and all the other tubes am made of glass.

8. The micro-optic fiber device as claimed in claim 7, wherein only the counter-bore tube is made of metal.

9. A micro-optic fiber device comprising:
   a first coupling tube, which interiorly defines a though passage wherein a first single fiber pigtail and a first micro lens are fixed;
   an inserting tube, which interiorly defines a through hole with a diameter larger than that of the through passage of the first coupling tube, said through hole having fixed therein an optical processing element with a diameter larger than that of the through passage of the first coupling tube;
   a second coupling tube, which interiorly defines a through passage wherein a second micro lens is fixed; and
   a third coupling tube, which interiorly defines a through passage wherein a second single fiber pigtail is fixed,
   wherein the optical processing element is fixed in the through hole of the inserting tube by applying a bonding agent between the outer lateral periphery of the optical processing element and the inner surface of the through hole surrounding the outer lateral periphery of the optical processing element, and
   said micro-optic fiber device is built by coupling the inserting tube with the first coupling tube and with the second coupling tube, and then coupling the second coupling tube with the third coupling tube.

* * * * *